US012631249B2

(12) United States Patent
Moscoso Cabrera et al.

(10) Patent No.: US 12,631,249 B2
(45) Date of Patent: May 19, 2026

(54) SPUR GEAR TRANSMISSION

(71) Applicant: Deere & Company, Moline, IL (US)

(72) Inventors: Javier Moscoso Cabrera, Getafe (ES);
Javier Jose Perez Ramirez, Pinto (ES);
Hector H. Ballester, Getafe (ES)

(73) Assignee: Deere & Company, Moline, IL (US)

( * ) Notice: Subject to any disclaimer, the term of this
patent is extended or adjusted under 35
U.S.C. 154(b) by 0 days.

(21) Appl. No.: 19/051,322

(22) Filed: Feb. 12, 2025

(65) Prior Publication Data

US 2025/0290563 A1 Sep. 18, 2025

(30) Foreign Application Priority Data

Mar. 13, 2024 (EP) ..................................... 24163376

(51) Int. Cl.
*F16H 57/04* (2010.01)
*F16H 1/06* (2006.01)
F16H 57/02 (2012.01)

(52) U.S. Cl.
CPC ..... *F16H 57/0423* (2013.01); *F16H 57/0409*
(2013.01); *F16H 57/0457* (2013.01);
(Continued)

(58) Field of Classification Search
CPC .... F16H 1/06; F16H 57/0409; F16H 57/0423;
F16H 57/0457; F16H 57/0493; F16H
57/0495; F16H 2057/02073
See application file for complete search history.

(56) References Cited

U.S. PATENT DOCUMENTS 1,220,810 A * 3/1917 Alquist ............... F16H 57/0447
184/6.12
1,813,819 A * 7/1931 Ross ....................... F16H 55/14
74/609
(Continued)

FOREIGN PATENT DOCUMENTS

CN 117345850 A * 1/2024 ......... F16H 57/0423
CN 117704040 A * 3/2024 .......... F16H 57/045
(Continued)

OTHER PUBLICATIONS

European Search Report issued in application No. 24163376.7,
dated Aug. 19, 2024, 18 pages.

*Primary Examiner* — Adam D Rogers

(57) ABSTRACT

A spur gear transmission includes a first gearwheel and a
second gearwheel in engagement with one another in a
rolling contact region, a transmission housing having hous-
ing walls which surround the first and second gearwheels at
the end faces and at the circumference, the transmission
housing being at least partially filled with a lubricating fluid,
the second gearwheel being guided in a rotating manner
through the lubricating fluid, and the lubricating fluid being
delivered in the direction of the rolling contact region, and
at least one deflector arrangement arranged directly ahead of
the rolling contact region in relation to the direction of
rotation of the gearwheels, being configured such that a
partial quantity of the lubricating fluid that can be delivered
to the rolling contact region by the second gearwheel is
diverted in the direction of at least one of the housing walls
surrounding the gearwheels at the end faces.

14 Claims, 5 Drawing Sheets

(52) U.S. Cl.
  CPC ........... *F16H 57/0495* (2013.01); *F16H 1/06* (2013.01); *F16H 2057/02073* (2013.01)

(56) References Cited

U.S. PATENT DOCUMENTS

| | | | | |
|---|---|---|---|---|
| 3,364,776 | A * | 1/1968 | Callahan ............. | F16H 57/0427 |
| | | | | 74/467 |
| 4,842,100 | A | 6/1989 | Cameron et al. | |
| 6,267,203 | B1 * | 7/2001 | Brissette ............. | F16H 57/0483 |
| | | | | 184/6.12 |
| 6,752,095 | B1 * | 6/2004 | Rylander ............... | A01C 7/046 |
| | | | | 111/900 |
| 7,846,052 | B2 | 12/2010 | Favache et al. | |
| 8,004,106 | B2 * | 8/2011 | Daniels ................. | F03D 7/0204 |
| | | | | 290/55 |
| 8,578,807 | B2 * | 11/2013 | Kunz .................. | F16H 57/0427 |
| | | | | 74/462 |
| 9,772,027 | B2 * | 9/2017 | Preston ............... | F16H 57/0409 |
| 10,260,616 | B2 * | 4/2019 | Lee ..................... | F16H 57/0423 |
| 10,859,152 | B2 * | 12/2020 | Yu ....................... | F16H 57/0475 |
| 11,248,680 | B2 | 2/2022 | Noonan et al. | |
| 12,055,210 | B2 * | 8/2024 | Hirata ................ | F16H 57/0423 |

FOREIGN PATENT DOCUMENTS

| | | | | | |
|---|---|---|---|---|---|
| DE | 4132780 | A1 * | 4/1992 | ......... | F16H 57/0423 |
| DE | 102022204868 | A1 | 1/2023 | | |
| DE | 102021211977 | A1 * | 4/2023 | ......... | F16H 57/0423 |
| DE | 102021132154 | B3 * | 5/2023 | ......... | F16H 57/0483 |
| DE | 102023104204 | A1 * | 8/2024 | ......... | F16H 57/0409 |
| DE | 102023107622 | A1 * | 10/2024 | ......... | F16H 57/0495 |
| DE | 102023132055 | B3 * | 4/2025 | ......... | F16H 57/0495 |
| EP | 3066366 | B1 | 9/2020 | | |
| EP | 4174343 | A1 | 5/2023 | | |
| EP | 4279767 | A1 * | 11/2023 | ......... | F16H 57/0423 |

* cited by examiner

SPUR GEAR TRANSMISSION

CROSS-REFERENCE TO RELATED APPLICATIONS

This application claims priority to European Patent Application No. 24163376.7, filed Mar. 13, 2024, which is hereby incorporated by reference.

FIELD OF THE DISCLOSURE

The disclosure relates to a spur gear transmission.

BACKGROUND

Spur gear transmissions are used to transmit motion and torque in agricultural harvesting machines.

SUMMARY

The disclosure relates to a spur gear transmission having a first gearwheel and a second gearwheel, wherein the gearwheels are in engagement with one another in a rolling contact region and are guided on axes of rotation which are aligned parallel to one another, and a transmission housing having housing walls which surround the gearwheels at the end faces and at the circumference, wherein the transmission housing can be at least partially filled with lubricating fluid, and wherein the second gearwheel can be guided in a rotating manner through the lubricating fluid, and lubricating fluid can be delivered in the direction of the rolling contact region.

U.S. Pat. No. 6,267,203 discloses an improved method for dissipating heat from a lubricant in a bevel gear transmission assembly. It comprises the use of a deflector in the axle housing of the bevel gear assembly. The deflector is formed on the axle housing wall in such a way that the lubricant is thrown against the deflector by a gear rim and is guided outward by the deflector to the axle ends of the axle assembly. As a result, the lubricant is exposed to a larger surface area, and the cooling efficiency of this system is greatly improved. The deflector is designed for a bevel gear assembly having an axle housing with a large volume or hollow space and guides the lubricant impinging upon it laterally into the axle ends. In the case of a spur gear transmission assembly having a transmission housing of small, compact construction, available hollow spaces are often limited, making it necessary to take further, supplementary, measures here in order to avoid overheating of the lubricant.

A spur gear transmission of compact construction is distinguished, for example, by the fact that the housing wall is directly adjacent to the revolving gearwheels or, in other words, the hollow space in the transmission housing is extremely small. Thus, there is also little space available to accommodate lubricant, and therefore the small quantity of lubricant generally also heats up relatively quickly. Moreover, owing to the small hollow space, the filling level in the lubricant sump is relatively high, and therefore a large proportion of an affected revolving gearwheel is passed deeply through the lubricant sump. This in turn has the effect that a relatively large amount of lubricant or lubricating oil is transported and agitated by the revolving gearwheel. This gives rise to the challenge, on the one hand, of passing sufficient lubricant into and through the rolling contact region but, on the other hand, also of limiting the quantity of lubricant which is directed to the region since the lubricant is sometimes intensively heated by the meshing of the gearwheels in the rolling contact region. To counteract overheating of the lubricant, it is furthermore helpful to provide as large a heat absorption area as possible on the housing wall, by means of which the heat can be dissipated in order to ensure sufficient cooling of the lubricant. It should be taken into account here that, on account of the revolving motion of the gearwheel guided through the lubricant sump, the lubricant is transported almost exclusively in the circumferential direction, and the housing wall forms only a relatively small area of the circumferential surface in the circumferential direction of the gearwheel, and thus a large proportion of the lubricant can be cooled only by means of a relatively small circumferential surface of the housing wall which is used for heat dissipation, according to some embodiments.

The object underlying the disclosure is considered to be that of specifying a spur gear transmission of the type stated at the outset by means of which the abovementioned concerns, for example overheating of the lubricant, are overcome.

The object is achieved according to the disclosure by the one or more embodiments herein. Further advantageous configurations and developments of the disclosure can be found in the one or more embodiments herein.

According to the disclosure, a spur gear transmission of the type stated at the outset is designed in such a way that at least one deflector arrangement is arranged directly ahead of the rolling contact region in relation to the direction of rotation of the gearwheels. The deflector arrangement is designed in such a way that at least a partial quantity of the lubricating fluid that can be delivered to the rolling contact region by the second gearwheel is diverted in the direction of at least one of the housing walls surrounding the gearwheels at the end faces.

By means of the disclosure, the lubricating system for a spur gear transmission operating with lubricant or lubricating oil is decisively improved, thus allowing a construction which is as compact as possible and allowing the formation of the housing wall in direct proximity to the gearwheels. By means of the disclosure, it is possible in a simple and economical manner to eliminate the abovementioned concerns that lead to overheating of the lubricant, according to some embodiments. For example, a situation where the entire quantity of lubricant transported by the gearwheel gets into the rolling contact region is avoided. In other words, a large proportion of the lubricant transported by the gearwheel is diverted, blocked or deflected to the end-face housing walls by the deflector arrangement before it enters the rolling contact region. As a result, less lubricant gets into the rolling contact region itself, leading to reduced overall heating of the lubricant. The lubricant diverted in the direction of the end-face housing walls by the deflector arrangement can cool down more efficiently there, with higher heat dissipation overall, on a surface which is significantly larger than the circumferential housing wall. The performance and reliability of the spur gear transmission and also the durability and efficiency of the lubricant are thereby improved overall, and the outlay on maintenance is reduced.

The deflector arrangement can have one or more fastening regions, which are held or fastened on an end-face housing wall. The holding or fastening can be accomplished by means of screws, for example. It is entirely conceivable to form the deflector arrangement integrally with the housing wall by casting. A welded construction is also possible, a welded joint thus being chosen instead of the screws as a fastening means.

One or more deflector parts can extend from a fastening part of the deflector arrangement, the deflector parts projecting into the transmission space and at least partially covering certain regions of the spur gear transmission, e.g. the rolling contact region of the gearwheels. The deflector parts can form a finger, web, orifice, vane or some other kind of profile and can project over the circumferential surface of the second gearwheel and significantly influence lubricant transport or at least partially prevent or block it. In this way, the lubricant transported in the direction of the rolling contact region by rotation of the gearwheel is blocked and deflected by the deflector parts. Here, the extent to which the deflector parts project over the circumferential region can vary and depends on how much of the lubricant transported by rotation is to be deflected or blocked. Thus, for example, a certain minimum quantity of lubricant can enter unhindered into the rolling contact region if the deflector part projects over or covers only a partial extent of the total width of the gearwheel transversely to the circumferential direction. Thus, for example, the deflector part may project over the circumferential region only by half of the width of the gearwheel (or alternatively more or less).

The at least one deflector part can have a first deflector part having a guide surface aligned perpendicularly to the circumferential surface of the second gearwheel, wherein the guide surface, extending from the fastening part counter to the direction of rotation of the second gearwheel, encloses an acute angle with the end-face housing wall. By virtue of the acute angle enclosed together with the housing wall, the lubricant flowing against the guide surface of the first deflector part is deflected toward the sides and delivered to the end-face housing wall. As a result, some of the lubricant transported by the rotation of the gearwheel is directed against the large-area end-face housing walls before entry into the rolling contact region, undergoing more efficient cooling on the walls than on the relatively small-area circumferential housing walls. As a result, on the one hand, less lubricant is heated by frictional heat in the rolling contact region and, on the other hand, more lubricant is subject to improved cooling.

The at least one deflector part can furthermore also have a second deflector part having a first guide surface aligned perpendicularly to the circumferential surface of the second gearwheel, wherein the guide surface, extending from the fastening part in the direction of rotation of the second gearwheel, encloses an obtuse angle with the end-face housing wall. The guide surface of the second deflector part has the effect that some of the lubricating fluid which has not been blocked or diverted at the guide surface of the first deflector part is selectively guided or deflected at the guide surface of the second deflector part in the direction of the central region of the circumferential surface of the second gearwheel. Furthermore, the first guide surface of the second deflector part ends adjacent to the rolling contact region and has the effect that the lubricant deflected by the first guide surface is guided selectively into the rolling contact region.

The second deflector part can furthermore comprise a deflector region having a further guide surface, which, starting from the first guide surface of the second deflector part, extends at an angle in the direction of the circumferential housing wall or in a direction away from the rolling contact region and encloses an obtuse angle with the first guide surface of the second deflector part. That deflector region of the second deflector part which comprises the further guide surface thus at least partially separates a transmission space or housing region surrounding the first gearwheel from a transmission space or housing region surrounding the second gearwheel, or at least partially delimits the two transmission spaces or housing regions with respect to one another. The further guide surface has the effect that lubricant transported in the direction of rotation by the second gearwheel does not get into the transmission space of the first gearwheel to any significant extent. As a result, the entry of lubricant transported in the direction of rotation by the second gearwheel into the transmission space surrounding the second gearwheel is very largely blocked or prevented or significantly reduced. Like the first guide surface, the further guide surface furthermore likewise ends adjacent to the rolling contact region and has the effect that the lubricant deflected into the center of the circumferential surface of the second gearwheel by the further guide surface is guided selectively into the rolling contact region.

The first deflector part is for example arranged ahead of the second deflector part in the direction of rotation of the second gearwheel. A partial quantity of lubricant which is transported in the direction of the first deflector part by rotation of the second gearwheel but gets past the deflector part is at least partially deflected by the second deflector part, and is thereby guided, on the one hand, along the first guide surface and in the direction of the central circumferential region of the second gearwheel and in the direction of the rolling contact region, and, on the other hand, along the further guide surface in the direction of the circumferential housing wall. For example, a significant quantity of lubricant entering the transmission space surrounding the first gearwheel past the rolling contact region is thereby reduced or blocked.

The at least one deflector arrangement described above can comprise a first and a second deflector arrangement. The two deflector arrangements are of substantially mirror-symmetrical design and are arranged opposite one another, in each case on one of the housing walls surrounding the gearwheels at the end faces. As already mentioned above, the extent to which the respective first and second deflector parts of the first and the second deflector arrangement project over the circumferential region of the second gearwheel can vary and, for example, can also be dimensioned in such a way that a passage gap of greater or lesser size is formed between the opposite free ends of the respective deflector parts or between the respective opposite guide surfaces, allowing unhindered passage of a residual quantity of lubricant. Depending on the configuration, this passage gap may also be entirely omitted, with the result that the free ends of the respective deflector parts touch.

As mentioned above, a passage gap can be formed between the first and the second deflector arrangement at the free ends of the respective first and/or second deflector part and can be dimensioned in such a way that a sufficient partial quantity of lubricant for lubrication gets into the rolling contact region. The size or width of the passage gap can vary from case to case and can be adapted to the design circumstances and requirements of the spur gear transmission. Accordingly, it may be expedient to provide a passage gap between the first deflector parts, through which gap a first partial quantity of agitated lubricant transported in the direction of rotation by the first gearwheel can pass unhindered, while a second partial quantity is diverted in the direction of the end-face housing walls by the guide surfaces of the first deflector parts. A further partial quantity passes more or less unhindered via the first deflector parts into a circumferential region of the second gearwheel that is formed between the first and the second deflector parts. The partial quantity of lubricant that has passed through the passage gap, as well as the partial quantity of lubricant which passes via the first deflector parts, thus collects in the circumferential region of the second gearwheel that is formed between the first and second deflector parts. The two partial quantities of lubricant which get into this circumferential region are fed to the second deflector parts by the rotary motion of the second gearwheel and there, as described above, a minimum proportion thereof is guided selectively in the direction of the rolling contact region by the first and second guide surfaces of the second deflector parts and by the passage gap provided there between the deflector parts. As described above, a residual quantity is deflected in the direction of the circumferential housing wall by the further guide surfaces of the second deflector parts. Thus, only a limited minimum proportion of lubricant reaches the rolling contact region in a selective manner, according to some embodiments. By adapting the geometry of the deflector parts, for example the length, height, shape and angling or alignment with respect to the fastening part, or angling or alignment with respect to the end-face and circumferential housing walls, and by adapting the passage gap, it is possible to selectively define and set the minimum partial quantity guided into the rolling contact region and to limit it to a quantity required for lubrication of the spur gear transmission.

The deflector arrangement interrupts the lubricant transport which is brought about by rotation of the second gearwheel and the lubricant quantity thereby agitated and taken along in the direction of rotation. As a result, the quantity of lubricant which gets into the rolling contact region and into the transmission space surrounding the first gearwheel is limited. In this case, only a minimum partial quantity of the lubricant transported in the direction of rotation by the second gearwheel is selectively guided into the rolling contact region, and a partial quantity is guided in the direction of the end-face housing walls, according to some embodiments. A further partial quantity is selectively prevented from entering the transmission space surrounding the first gearwheel and is guided in the direction of the circumferential housing walls. As a result of the reduced quantity of lubricant which is delivered into and through the rolling contact region, the total heating of the lubricant is reduced. Moreover, increased heat absorption and hence improved, more efficient cooling of the lubricant is achieved by deflection and diversion of the lubricant to the large-area end-face housing walls. Overall, a significantly improved thermal balance, namely less heat generation and better cooling, is obtained with regard to any concern with overheating of the lubricant. In addition, the proposed geometry of the deflector arrangement with two deflector parts and, for example, the further guide surface reduce the inflow of lubricant to the transmission space of the first gearwheel and avoid flooding in this regard. Overall, a number of advantages are obtained, for example optimized and more selective feeding of lubricant into the rolling contact region to be lubricated, less heating of the lubricant overall, increased reliability of sealing by virtue of reduced flooding and a lower lubricant temperature and, not least, as a result, also a lower outlay on maintenance with longer maintenance intervals and a longer life of the seals and the lubricant.

The above and other features will become apparent from the following detailed description and accompanying drawings.

BRIEF DESCRIPTION OF THE DRAWINGS

The disclosure and further advantages and advantageous developments and

Figure 1:
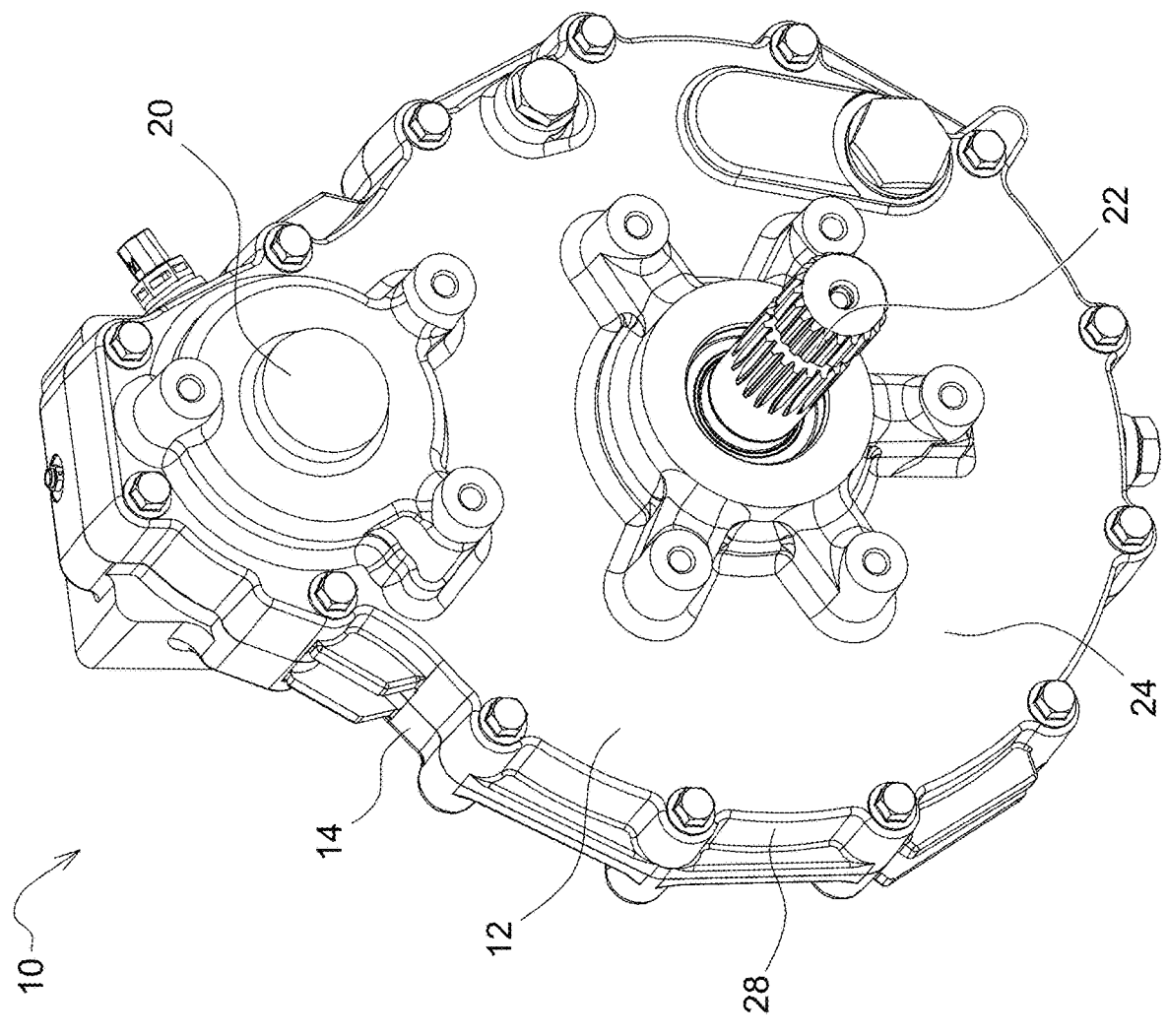
Figure 2:
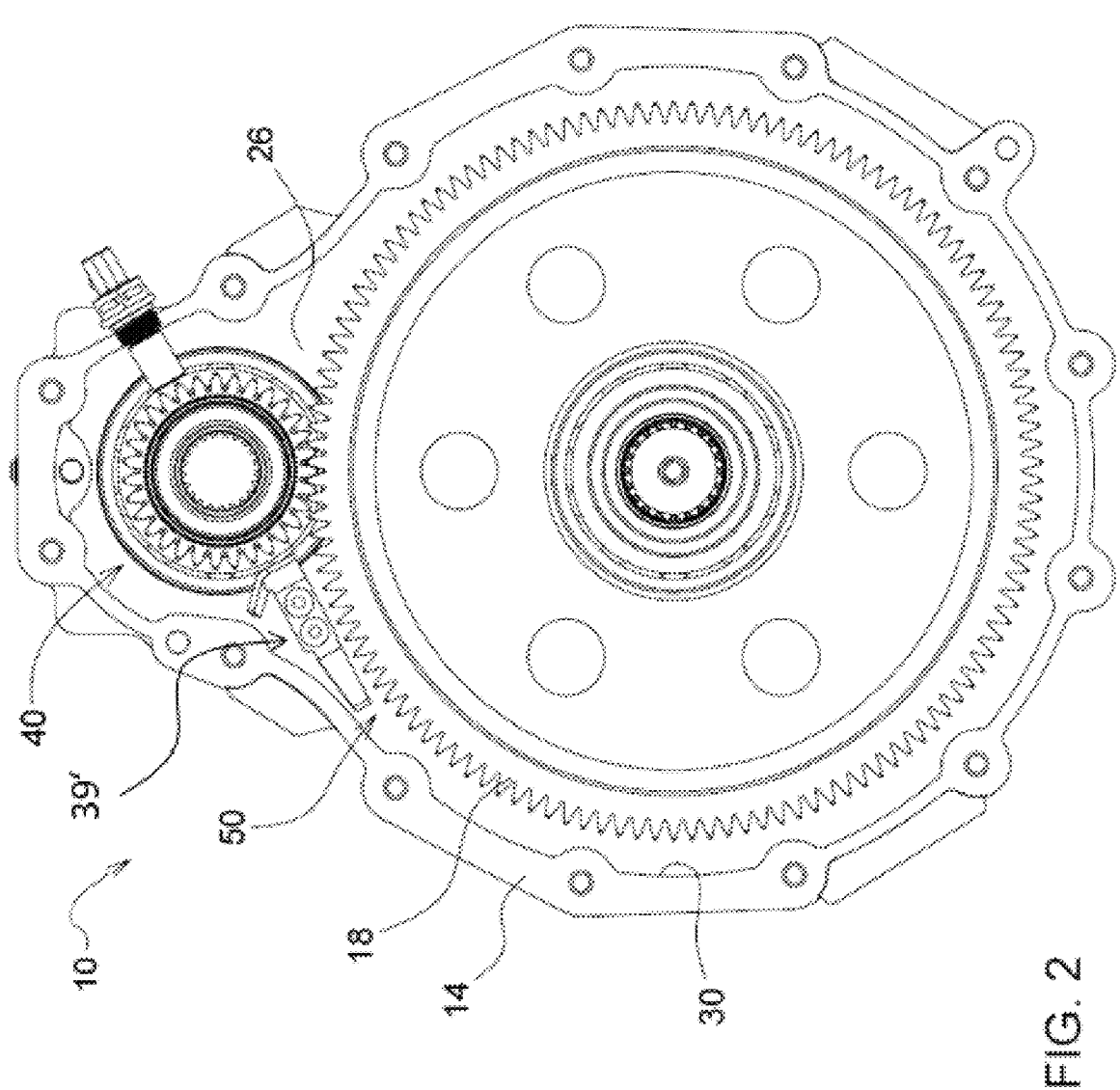
Figure 3:
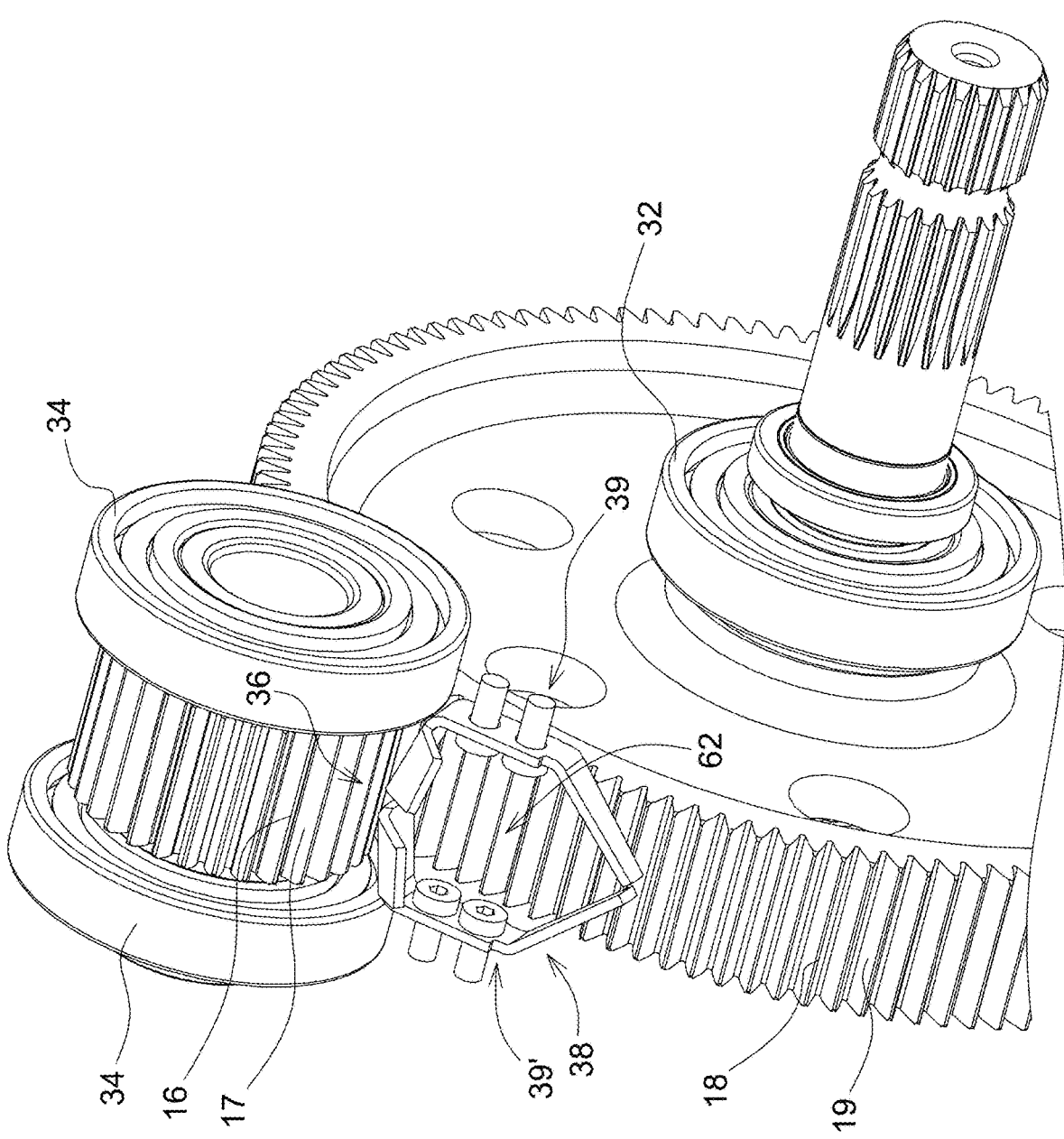
Figure 4:
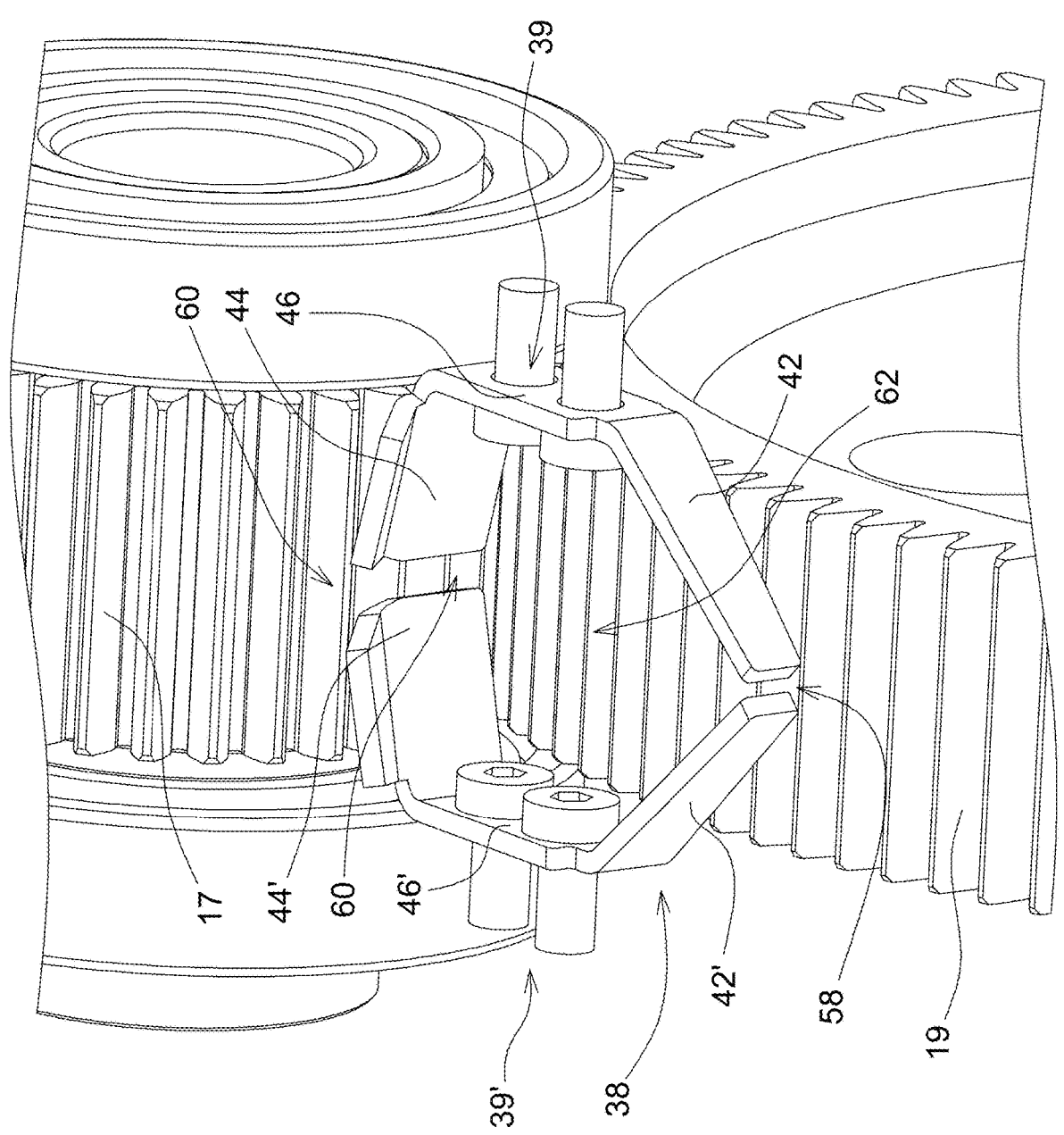
Figure 5:
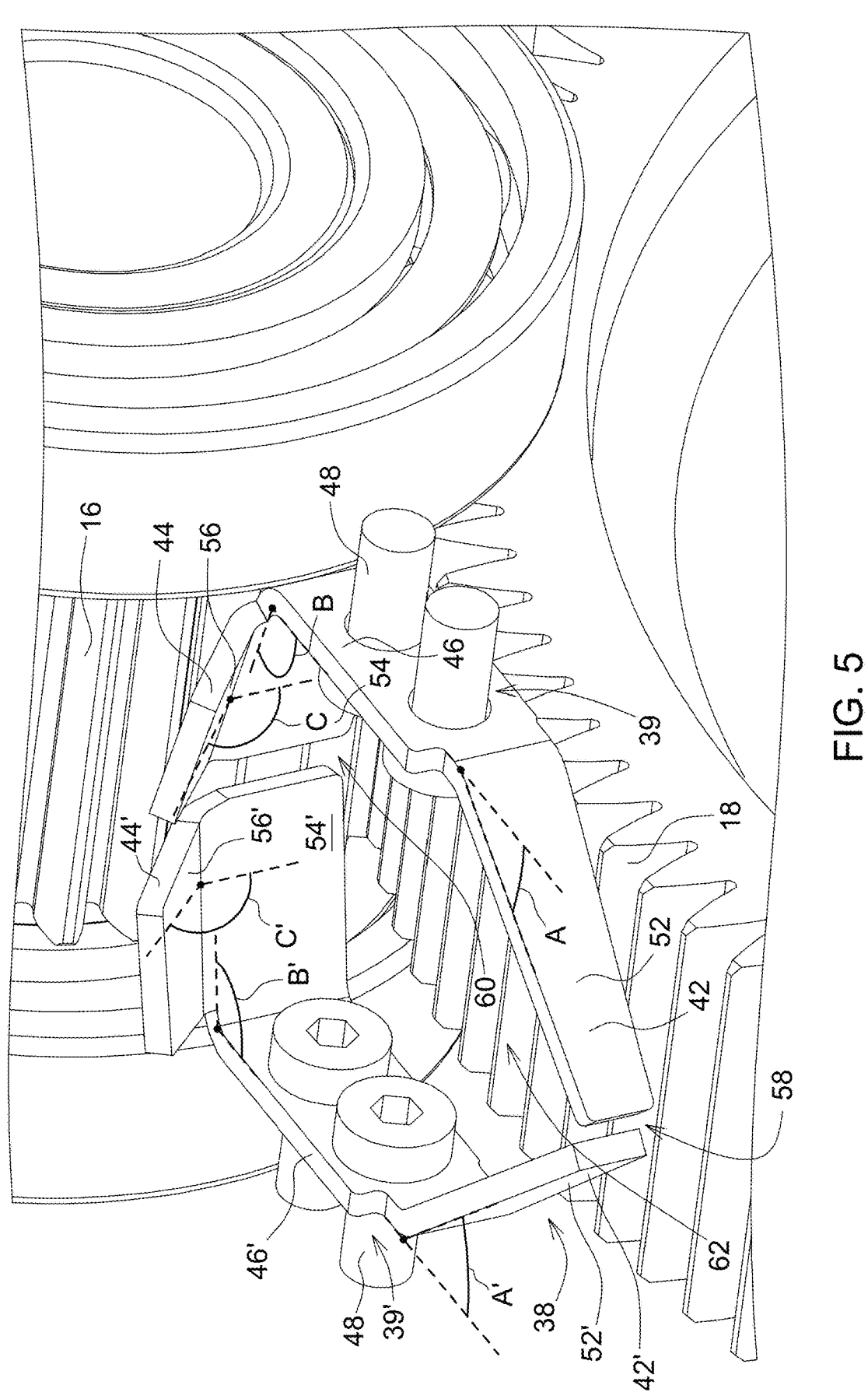

6 embodiments of the disclosure will be described and explained in more detail below with reference to the drawing, which shows an example embodiment of the disclosure. In the drawings:

FIG. 1 shows a perspective side view of a closed spur gear transmission;

FIG. 2 shows a side view of the spur gear transmission in the opened state with a gearwheel pair and a deflector arrangement;

FIG. 3 shows an enlarged perspective partial view of the gearwheel pair and the deflector arrangement of the spur gear transmission from FIGS. 1 and 2;

FIG. 4 shows another enlarged perspective partial view of the gearwheel pair and the deflector arrangement of the spur gear transmission from FIGS. 1 and 2; and FIG. 5 shows an enlarged perspective detail view of the deflector arrangement from FIG. 4.

DETAILED DESCRIPTION

The embodiments or implementations disclosed in the above drawings and the following detailed description are not intended to be exhaustive or to limit the present disclosure to these embodiments or implementations.

With reference to FIGS. 1 to 5, a description is given of a spur gear transmission 10 which is used in the drivetrain for harvesting attachments in agricultural harvesting machines, for example. A spur gear transmission 10 of this kind has a relatively compact construction, with a first and a second transmission housing half 12, 14, in which a first and a second gearwheel 16, 18 are arranged on a first and a second axis of rotation 20, 22 aligned parallel to one another. The transmission housing halves 12, 14 each have an end-side housing wall 24 and 26 and a circumferential housing wall 28 and 30. The designation "circumferential" and "end-face" relates to the sides of the gearwheels on which the circumferential surfaces and the end surfaces of the first and second gearwheels 16, 18 are formed, wherein the gearwheels 16, 18 are provided on the circumference with a multiplicity of teeth 17, 19, and the surfaces aligned perpendicularly to the axes of rotation 20, 22 on the front and rear sides of the gearwheels 16, 18 represent the end surfaces or end faces.

The transmission housing halves 12, 14 are screwed together by means of a multiplicity of threaded bolts distributed over the circumference. The axes of rotation 20, 22 are furthermore provided with radial shaft sealing rings 32, 34. For the purpose of lubrication and cooling, the spur gear transmission 10 is filled to a certain extent with a lubricant (not shown), wherein the second gearwheel 18 is guided in a lower region (a region of the second gearwheel 18 which is below the axis of rotation 14) through a lubricant reservoir (sump), and the lubricant is agitated by rotation by means of the teeth 19 and delivered in the direction of rotation, in the direction of the first gearwheel 16, to the upper part of the spur gear transmission. Here, the teeth 17 of the first gearwheel 16 and the teeth 19 of the second gearwheel 18 are in engagement with one another in a rolling contact region 36, wherein the lubricant delivered by the second gearwheel 18 is delivered as far as the rolling contact region 36 or even transported through the latter and lubricates this region accordingly.

A deflector arrangement 38 is provided directly ahead of the rolling contact region 36 in the direction of rotation of the second gearwheel 18, serving to ensure that some of the lubricant transported by the gearwheel 18 is deflected or diverted to the end-face housing walls 24, 26. This ensures that less lubricant gets into the rolling contact region 36 and, as a result, also less lubricant can be heated there by the rolling contact process. The diversion of a large proportion of lubricant to the end-face housing walls 24, 26 furthermore provides greater heat absorption for the lubricant to be cooled since the end-face housing walls 24, 26 have an absorption area which is many times larger than the circumferential housing walls 28, 30. Overall, the lubricant heats up to a lesser extent and is also cooled more intensively. This significantly reduces the thermal stress on the lubricant. In addition, the deflector arrangement 38 also ensures that a large proportion of the lubricant transported into the region of the deflector arrangement 38 gets from an inlet to a housing region 40 surrounding the first gearwheel 16, as explained in greater detail below with reference to FIG. 5. Flooding of the housing region 40 surrounding the first gearwheel 16 is thereby avoided.

A detailed illustration of the deflector arrangement 38 is depicted in FIG. 5. The deflector arrangement 38 is positioned directly ahead of the rolling contact region 36 in the direction of rotation of the second gearwheel 18. In the example shown, the deflector arrangement 38 is embodied in two parts, with a first and a second deflector arrangement 39, 39', wherein the two deflector arrangements 39, 39' are of mirror-symmetrical design and have oppositely arranged first deflector parts 42, 42' and oppositely arranged second deflector parts 44, 44', which each extend from oppositely arranged fastening parts 46, 46' in the direction of the second gearwheel 18. The fastening parts 46, 46' of the deflector arrangement 38 are each fastened by means of threaded bolts 48 on one of the end-face housing walls 24, 26 and are aligned substantially parallel to the end-face housing walls 24, 26.

From the fastening parts 46, 46' of the deflector arrangement 38, the deflector parts 42, 42' extend counter to the direction of rotation of the second gearwheel 18 over the circumferential surface of the second gearwheel 18 and project into the housing region 50 surrounding the second gearwheel 18. The deflector parts 42, 42' have a guide surface 52, 52' aligned perpendicularly to the circumferential surface of the second gearwheel 18, wherein the guide surface 52, 52', extending from the fastening part 46, 46' counter to the direction of rotation of the second gearwheel, encloses an acute angle A, A' with the end-face housing wall 24, 26. By virtue of the acute angle A, A' enclosed together with the end-face housing wall 24, 26, the lubricant flowing against the guide surface 52, 52' of the first deflector part 42, 42' is deflected toward the end faces of the spur gear transmission 10 and delivered to the respective end-face housing wall 24, 26. As a result, some of the lubricant transported by the rotation of the second gearwheel 18 is directed against the large-area end-face housing walls 24, 26 before entry into the rolling contact region 36, undergoing more efficient cooling on the walls than on the relatively small-area circumferential housing walls 28, 30. As a result, on the one hand, less lubricant is heated by frictional heat in the rolling contact region 36 and, on the other hand, more lubricant is subject to improved cooling.

The second deflector part 44, 44' has a first guide surface 54, 54' aligned perpendicularly to the circumferential surface of the second gearwheel 18, wherein the guide surface 54, 54', extending from the fastening part 46, 46' in the direction of rotation of the second gearwheel, encloses an obtuse angle with the end-face housing wall 24, 26. The second deflector part 44, 44' has the effect that some of the lubricating fluid which has not been blocked or diverted at the guide surface 52, 52' of the first deflector part 42, 42' is selectively guided or deflected at the guide surface 54, 54' of the second deflector part 44, 44' in the direction of a central region of the circumferential surface of the second gearwheel 18. Furthermore, the first guide surface 54, 54' of the second deflector part 44, 44' ends adjacent to the rolling contact region 36 and has the effect that the lubricant deflected by the first guide surface 54, 54' is guided selectively into the rolling contact region 36.

The second deflector part 44, 44' furthermore comprises a deflector region having a further guide surface 56, 56', which, starting from the first guide surface 54, 54', extends at an angle counter to the direction of rotation in the direction of the circumferential housing wall or runs in a direction away from the rolling contact region 36 and encloses an obtuse angle with the first guide surface 54, 54'. That deflector region of the second deflector part 44, 44' which comprises the further guide surface 56, 56' thus at least partially separates a housing region 40 surrounding the first gearwheel 16 from a housing region 50 surrounding the second gearwheel 18, or at least partially delimits the two housing regions 40, 50 with respect to one another. The further guide surface 56, 56' has the effect that lubricant transported in the direction of rotation by the second gearwheel 18 does not get into the housing region 40 of the first gearwheel 16 to any significant extent. As a result, the entry of lubricant transported in the direction of rotation by the second gearwheel 18 into the housing region 40 surrounding the first gearwheel 16 is very largely blocked or prevented or significantly reduced. Like the first guide surface 54, 54', the further guide surface 56, 56' furthermore likewise ends adjacent to the rolling contact region 36 and has the effect that the lubricant deflected into the center of the circumferential surface of the second gearwheel by the further guide surface 56, 56' is guided selectively into the rolling contact region 36.

Overall, the lubricant transported in the direction of the rolling contact region 36 by rotation of the gearwheel 18 is significantly blocked, deflected and/or guided selectively by the deflector parts 42, 42', 44, 44'. Here, the extent to which the deflector parts 42, 42', 44, 44' project over the circumferential region can vary and depends on how much of the lubricant transported by rotation is to be deflected or blocked. The deflector parts 42, 42', 44, 44' can be designed as baffles, webs, fingers, an orifice or vanes or some other kind of profile.

The first deflector part 42, 42' is arranged ahead of the second deflector part 44, 44' in the direction of rotation of the second gearwheel 18. A partial quantity of lubricant which is transported in the direction of the first deflector part 42, 42' by rotation of the second gearwheel 18 but gets past the deflector part is at least partially deflected by the second deflector part 44, 44' and is thereby guided, on the one hand, along the first guide surface 54, 54' in the direction of the rolling contact region 36 and, on the other hand, along the further guide surface 56, 56' in the direction of the rolling contact region 36 and in the direction of the circumferential housing wall 28, 30. The guidance has the effect that there is a significant reduction in the amount of lubricant which gets into the housing region 40 surrounding the first gearwheel 16.

A passage gap 58, 60 is formed between the first and the second deflector arrangement 39, 39' at the free ends of the respective first and/or second deflector part 42, 42', 44, 44' and is dimensioned in such a way that a sufficient partial quantity of lubricant for lubrication gets into the rolling contact region 36. As already mentioned above, the size or width of the passage gap 58, 60 can vary from case to case and can be adapted to the design circumstances and requirements of the spur gear transmission 10. Accordingly, it may be expedient to provide a passage gap 58 between the first deflector parts 42, 42', through which gap a first partial quantity of agitated lubricant transported in the direction of rotation by the first gearwheel 18 can pass unhindered, while a second partial quantity is diverted in the direction of the end-face housing walls 24, 26 by the guide surfaces 52, 52' of the first deflector parts 42, 42'. A further partial quantity passes more or less unhindered via the first deflector parts 42, 42' into a circumferential region 62 of the second gearwheel 18 that is formed between the first and the second deflector parts 42, 42', 44, 44'. The partial quantity of lubricant that has passed through the passage gap 58, as well as the partial quantity of lubricant which passes via the first deflector parts 42, 42', thus collects in the circumferential region 62 of the second gearwheel 18 that is formed between the first and second deflector parts 42, 42', 44, 44'. The two partial quantities of lubricant which get into this circumferential region 62 are fed to the second deflector parts 44, 44' by the rotary motion of the second gearwheel 18 and there, as described above, a minimum proportion thereof is guided selectively in the direction of the rolling contact region 36 by the first and further guide surfaces 54, 54', 56, 56' of the second deflector parts 44, 44' and by the passage gap 60 provided there between the deflector parts 44, 44'. As described above, a residual quantity is deflected in the direction of the circumferential housing wall 28, 30 by the further guide surfaces 56, 56' of the second deflector parts 44, 44'. Thus, only a limited minimum proportion of lubricant reaches the rolling contact region 36 in a selective manner, according to some embodiments. By adapting the geometry of the deflector parts 42, 42', 44, 44', for example the length, height, shape and angling or alignment with respect to the respective fastening part 46, 46' or angling or alignment with respect to the end-face and circumferential housing walls 24, 26, 28, 30, and by adapting the passage gap 58, 60, it is possible to selectively define and set the minimum partial quantity guided into the rolling contact region 36 and to limit it to a quantity required for lubrication of the spur gear transmission 10.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A spur gear transmission, comprising:
a first gearwheel and a second gearwheel in engagement with one another in a rolling contact region and guided on axes of rotation aligned parallel to one another;
a transmission housing having housing walls which surround the first and second gearwheels at end faces and at the circumference, the transmission housing being at least partially filled with a lubricating fluid, the second gearwheel being guided in a rotating manner through the lubricating fluid, and the lubricating fluid being delivered in the direction of the rolling contact region; and
at least one deflector arrangement arranged directly ahead of the rolling contact region in relation to the direction of rotation of the gearwheels, being configured such that a partial quantity of the lubricating fluid that can be delivered to the rolling contact region by the second gearwheel is diverted in the direction of at least one of the housing walls surrounding the gearwheels at the end faces, the at least one deflector arrangement having a fastening region held on one of the housing walls, the at least one deflector arrangement including at least one deflector part extending from the fastening region and projecting over the circumferential surface of the second gearwheel, and the at least one deflector part including a first deflector part having a guide surface aligned perpendicularly to the circumferential surface of the second gearwheel, wherein the guide surface of the first deflector part, extending from the fastening part counter to the direction of rotation of the second gearwheel, encloses an acute angle with the end-face housing wall.

2. The spur gear transmission of claim 1, wherein the at least one deflector part has a second deflector part having a first guide surface aligned perpendicularly to the circumferential surface of the second gearwheel, wherein the first guide surface of the second deflector part, extending from the fastening part in the direction of rotation of the second gearwheel, encloses an obtuse angle with the end-face housing wall.

3. The spur gear transmission of claim 2, wherein the second deflector part comprises a deflector region having a further guide surface, which, starting from the first guide surface of the second deflector part, extends at an angle in the direction of one of the housing walls and encloses an obtuse angle with the first guide surface of the second deflector part.

4. The spur gear transmission of claim 3, wherein the deflector region of the second deflector part which comprises the further guide surface at least partially delimits a transmission space surrounding the first gearwheel from a transmission space surrounding the second gearwheel.

5. The spur gear transmission of claim 2, wherein the first deflector part is arranged ahead of the second deflector part in the direction of rotation of the second gearwheel.

6. The spur gear transmission of one of claim 2, wherein the at least one deflector arrangement comprises a first and a second deflector arrangement, wherein the first and second deflector arrangements are of substantially mirror-symmetrical design and are arranged opposite one another, in each case on one of the housing walls surrounding the gearwheels at the end faces.

7. The spur gear transmission of claim 6, wherein a passage gap is formed between the first and the second deflector arrangements at free ends of the respective first and second deflector parts.

8. An agricultural harvesting machine including a spur gear transmission, comprising:

a first gearwheel and a second gearwheel in engagement with one another in a rolling contact region and guided on axes of rotation aligned parallel to one another;

a transmission housing having housing walls which surround the first and second gearwheels at end faces and at the circumference, the transmission housing being at least partially filled with a lubricating fluid, the second gearwheel being guided in a rotating manner through the lubricating fluid, and the lubricating fluid being delivered in the direction of the rolling contact region; and at least one deflector arrangement arranged directly ahead of the rolling contact region in relation to the direction of rotation of the gearwheels, being configured such that a partial quantity of the lubricating fluid that can be delivered to the rolling contact region by the second gearwheel is diverted in the direction of at least one of the housing walls surrounding the gearwheels at the end faces, the at least one deflector arrangement having a fastening region held on one of the housing walls, the at least one deflector arrangement including at least one deflector part extending from the fastening region and projecting over the circumferential surface of the second gearwheel, and the at least one deflector part including a first deflector part having a guide surface aligned perpendicularly to the circumferential surface of the second gearwheel, wherein the guide surface of the first deflector part, extending from the fastening part counter to the direction of rotation of the second gearwheel, encloses an acute angle with the end-face housing wall.

9. The agricultural harvesting machine of claim 8, wherein the at least one deflector part has a second deflector part having a first guide surface aligned perpendicularly to the circumferential surface of the second gearwheel, wherein the first guide surface of the second deflector part, extending from the fastening part in the direction of rotation of the second gearwheel, encloses an obtuse angle with the end-face housing wall.

10. The agricultural harvesting machine of claim 9, wherein the second deflector part comprises a deflector region having a further guide surface, which, starting from the first guide surface of the second deflector part, extends at an angle in the direction of one of the housing walls and encloses an obtuse angle with the first guide surface of the second deflector part.

11. The agricultural harvesting machine of claim 10, wherein the deflector region of the second deflector part which comprises the further guide surface at least partially delimits a transmission space surrounding the first gearwheel from a transmission space surrounding the second gearwheel.

12. The agricultural harvesting machine of claim 9, wherein the first deflector part is arranged ahead of the second deflector part in the direction of rotation of the second gearwheel.

13. The agricultural harvesting machine of one of claim 9, wherein the at least one deflector arrangement comprises a first and a second deflector arrangement, wherein the first and second deflector arrangements are of substantially mirror-symmetrical design and are arranged opposite one another, in each case on one of the housing walls surrounding the gearwheels at the end faces.

14. The agricultural harvesting machine of claim 13, wherein a passage gap is formed between the first and the second deflector arrangements at free ends of the respective first and second deflector parts.

* * * * *